(12) United States Patent
Kitchin

(10) Patent No.: US 7,260,392 B2
(45) Date of Patent: Aug. 21, 2007

(54) SEAMLESS TEARDOWN OF DIRECT LINK COMMUNICATION IN A WIRELESS LAN

(75) Inventor: Duncan M. Kitchin, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 433 days.

(21) Appl. No.: 10/255,265

(22) Filed: Sep. 25, 2002

(65) Prior Publication Data

US 2004/0058682 A1 Mar. 25, 2004

(51) Int. Cl.
*H04Q 7/20* (2006.01)
(52) U.S. Cl. ............... 455/432.1; 455/436; 455/426.1; 455/443; 370/331
(58) Field of Classification Search .......... 455/445, 455/436–439, 446, 422.1, 443, 41.2, 432.1, 455/426.1; 370/331, 332, 335, 395.4; 709/225, 709/237
See application file for complete search history.

(56) References Cited

U.S. PATENT DOCUMENTS

| | | | | |
|---|---|---|---|---|
| 5,261,117 | A * | 11/1993 | Olson | 455/510 |
| 5,666,661 | A | 9/1997 | Grube et al. | 455/509 |
| 6,047,178 | A * | 4/2000 | Frlan | 455/423 |
| 6,052,369 | A * | 4/2000 | Hamalainen et al. | 370/389 |
| 6,236,656 | B1 * | 5/2001 | Westerberg et al. | 370/395.4 |
| 6,657,981 | B1 * | 12/2003 | Lee et al. | 370/331 |
| 6,680,929 | B1 * | 1/2004 | Iida et al. | 370/348 |
| 6,791,962 | B2 * | 9/2004 | Wentink | 370/338 |
| 6,894,992 | B1 * | 5/2005 | Morvan et al. | 370/329 |
| 6,990,343 | B2 * | 1/2006 | Lefkowitz | 455/436 |
| 7,039,358 | B1 * | 5/2006 | Shellhammer et al. | 455/426.1 |
| 7,146,433 | B2 * | 12/2006 | Cromer et al. | 709/239 |
| 2002/0120740 | A1 * | 8/2002 | Ho et al. | 709/225 |
| 2003/0027554 | A1 * | 2/2003 | Haumont | 455/414 |
| 2003/0037169 | A1 * | 2/2003 | Kitchin | 709/249 |
| 2003/0202505 | A1 * | 10/2003 | Ozugur | 370/352 |
| 2004/0203781 | A1 * | 10/2004 | Lefkowitz | 455/436 |
| 2004/0224637 | A1 * | 11/2004 | Silva et al. | 455/63.4 |

(Continued)

FOREIGN PATENT DOCUMENTS

| | | |
|---|---|---|
| EP | 1 168 676 A | 1/2002 |
| GB | 2 287 612 A | 9/1995 |

OTHER PUBLICATIONS

ETSI TS 101 761-4 V1.1.1 (Jun. 2000), Technical Specification, Broadband Radio Access networks (BRAN); HIPERLAN Type 2; Data Link Control (DLC) Layer; Part 4: Extension for Home Environment, pp. 2, 16-17, no month.

(Continued)

*Primary Examiner*—George Eng
*Assistant Examiner*—Kamran Afshar
(74) *Attorney, Agent, or Firm*—Blakely, Sokoloff, Taylor & Zafman LLP

(57) ABSTRACT

In a wireless local area network (LAN), a source node initially communicates with a destination node using a direct link. After the destination node moves to a different location and becomes associated with a new access point (AP), the destination node notifies the source node. The source node then tears down the direct link and re-establishes communication with the destination node using the new AP.

17 Claims, 3 Drawing Sheets

U.S. PATENT DOCUMENTS

2004/0266427 A1* 12/2004 Kurokawa ............... 455/426.2
2005/0026646 A1*  2/2005 Naim et al. .............. 455/552.1
2006/0105785 A1*  5/2006 Gfeller et al. ........... 455/456.5

OTHER PUBLICATIONS

Wim Diepstraten et al., "WiSP Wireless Sidelink Protocol", Doc.: IEEE 802.11-02/465r0, Jul. 2002, Wim Diepstraten, Agere Systems, pp. 1-12.

Menzo Wentink, "Direct Stream Request Protocol (DSRP)", Doc.: IEEE802.11-02/42r0, Jul. 2002, Menzo Wentink, Intersil, pp. 1-16.

Michael et al., "Combined Cellular/Direct Method of Inter-Vehicle Communication", Proceedings of the IEEE Intelligent Vehicles Symposium 2000, Dearborn MI, Oct. 3-5, 2000, pp. 534-539.

Stevens, "TCP/IP Illustrated vol. 1, The Protocols", XP002270934, Jul. 1999, Addison-Wesley, Readihg, Massachusetts, USA, pp. 225-227.

Tabbane, "Handbook of Mobile Radio Networks", XP-002270933, 2000, Artech House, Norwood, MA, pp. 320-322, no month.

Tanenbaum, "Computer Networks—Foruth Edition", XP-002270935, Aug. 31, 2002, Pearson Education International, Amsterdam NL, pp. 412-413.

* cited by examiner

SEAMLESS TEARDOWN OF DIRECT LINK COMMUNICATION IN A WIRELESS LAN

FIELD OF THE INVENTION

The present invention relates to the field of communication, more particularly relating to methods and apparatuses for wireless communication.

BACKGROUND

An infrastructure based wireless local area network (LAN) is defined as one in which there is, within a single logical link layer wireless LAN segment, a designated network node that performs control of membership of that link layer segment, by way of an association function, and may also, but not necessarily, have access to means of communication with other wired or wireless link layer LAN segments. The designated network node is referred to as an access point (AP), which includes an association function for control of membership of the segment and also contains a logical transport to other segments. The logical transport to the other segments is referred to as a distribution system (DS). The DS may be null if there is no other link layer segment.

FIG. 1 is a block diagram illustrating prior art LAN segments. Typically, data packets to be sent from a source node to a destination node are first sent to the AP with which the source node is associated. The AP then determines whether the destination node is also associated with it or with another AP. If the destination node is associated with another AP, then the destination node may only be reached via the DS. For example, referring to FIG. 1, when the source node 115 wants to send data to the destination node 120 (illustrated by the dotted arrow), it first sends the data to the AP 110 using path 155. Because the destination node 120 is also associated with the AP 110, the AP 110 then forwards the data to the destination node 120 using path 156. As another example, when the source node 115 wants to send data to the destination node 125, it first sends the data to the AP 110 using the path 155. Because the destination node 125 is associated with another AP 105, the AP 110 needs to forward the data to the AP 105 using path or DS 160. The AP 105 then forwards the data to the destination node 125 using the path 165. The process of forwarding the data from the source node to the destination node in both examples is inefficient because more network resources are used to transmit the same data more than once before the destination node receives the data.

There are schemes that may be followed to set up and maintain direct links between a source node and a destination node so that data may be sent directly from the source node to the destination node. For example, one of these schemes is described in a document titled "Wireless Address Resolution Protocol" (Document IEEE 802.11-02/016r0) by Duncan Kitchin of Intel Corporation. Another scheme is described in a document titled "Direct Stream Request Protocol (DSRP)" (Document IEEE 802.11-02/421r0) by Menzo Wentink of Intersil Corporation. Using one of these schemes, the data may be transferred directly from a source node to a destination node. For example, referring to FIG. 1, the source node 115 may send data directly to the destination node 120 without having to first send the data to the AP 110.

Even though the proposals mentioned above describe how to set up and maintain the direct links, they fail to provide adequate support for dynamic network topology resulting from devices moving to different locations. For example, these proposals use a time out approach to enable a source node to recognize that a destination node that it has been communicating is no longer positioned in the same location. The proposals, however, does not address how to reroute data to the destination node at its new location.

BRIEF DESCRIPTION OF THE DRAWINGS

The following drawings disclose various embodiments of the present invention for purposes of illustration only and are not intended to limit the scope of the invention.

DETAILED DESCRIPTION

In one embodiment, a method and a system for tearing down a direct communication link in a wireless local area network (WLAN) and routing data using another communication link is disclosed. Initially, a direct link is established to enable a source node to communicate with a destination node while both nodes are in a first basic service set (BSS). The destination node then moves to a second BSS and notifies the source node from the second BSS. The source node then tears down the direct link. An alternate link is established to enable the source node to resume communication with the destination node.

In the following description, for purposes of explanation, numerous specific details are set forth in order to provide a thorough understanding of the present invention. It will be evident, however, to one skilled in the art that the present invention may be practiced without these specific details. In other instances, well-known structures, processes and devices are shown in block diagram form or are referred to in a summary manner in order to provide an explanation without undue detail.

As used herein, the term "when" may be used to indicate the temporal nature of an event. For example, the phrase "event 'A' occurs when event 'B' occurs" is to be interpreted to mean that event A may occur before, during, or after the occurrence of event B, but is nonetheless associated with the occurrence of event B. For example, event A occurs when event B occurs if event A occurs in response to the occurrence of event B or in response to a signal indicating that event B has occurred, is occurring, or will occur.

Figure 1:
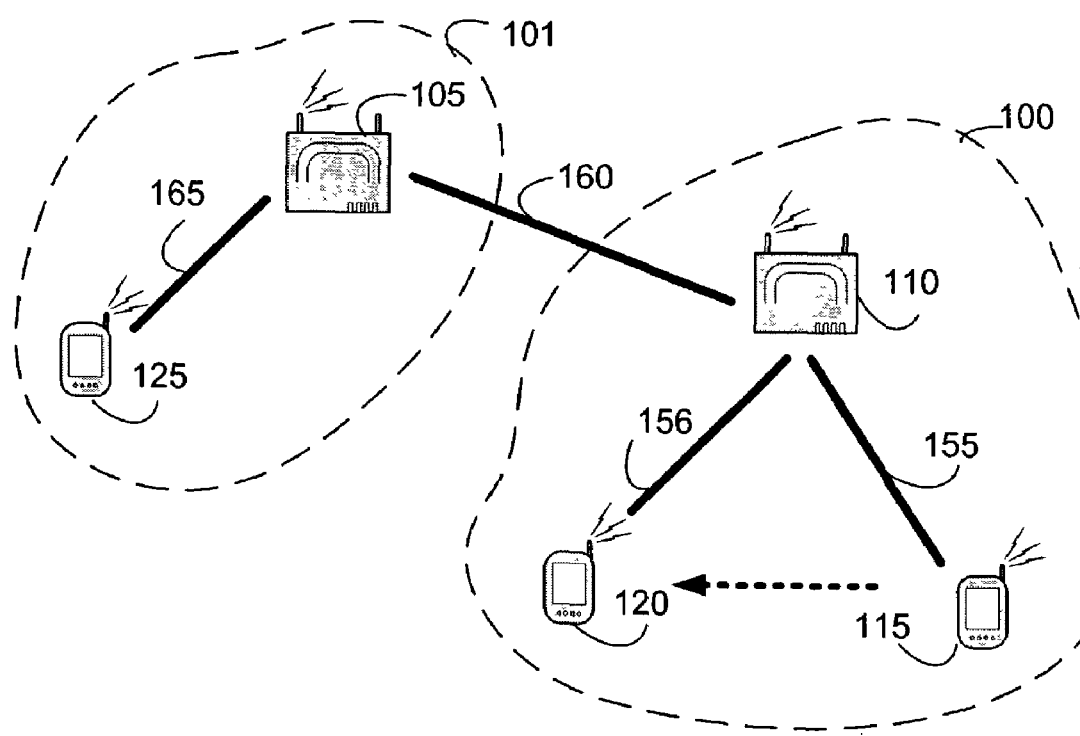
FIG. 1 is a block diagram illustrating prior art LAN segments.

Referring to FIG. 1, while the source node 115 communicates with the destination node 120 using a direct link, both the source node 115 and the destination node 120 are associated with the same access point (AP) 110. The AP 110, the source node 115, and the destination node 120 belong in the LAN segment or basic service set (BSS) 100. Similarly, the node 125 is associated with the AP 105 in the BSS 101. Typically, when the source node 115 sends data to the destination node 120, data may be sent in the form of packets. Because individual instances of packet transmit attempts may fail, a transmitter (not shown) in the source node 115 may be used to retry those packets that fail until they are successfully received by the destination node 120. The transmitter knows whether a given attempt has been successful because a receiver (not shown) in the destination node 120 responds with an acknowledgement for each successful transmission. Thus, the transmitter sends each packet and waits for an acknowledgement. If the transmitter receives an acknowledgement, it moves onto the next packet, but if it does not, it retransmits the same packet. The transmitter may continue to retransmit until it receives an acknowledgement. Since the transmitter retries the same packet until it succeeds before moving onto the next packet, no packets are lost or delivered out of order.

In a situation when a packet is successfully received by the receiver in the destination node 120, but the acknowledgement from the receiver is not received by the transmitter in the source node 115, the transmitter may interpret that the packet is lost. The transmitter may then retransmit the same packet, resulting in a duplicate packet received at the receiver. One method that may be used to resolve the duplicate packet problem involves using sequence information and a duplicate detection cache. For example, each packet may be marked with a monotonically increasing sequence number. Packets that are to be retransmitted by the transmitter are associated with the same sequence number as the same packets during the first transmission attempt. The receiver in the destination node 120 may maintain a duplicate detection cache, which contains the sequence number of the last successfully received packets. This allows the receiver to determine whether any packet it receives is a duplicate, and when a duplicate packet is determined, it may be discarded. The receiver may then send an acknowledgement to the transmitter to confirm with the transmitter that the packet has been received and does not to be retransmitted. It may be noted that, in the example illustrated above, the sequence information known to the source node 115 and stored in the destination node 120 is local to the BSS 100 because both the source node 115 and the destination node 120 are in the BSS 100. Although the above example refers to using the sequence information and the duplicate detection cache as one method of detecting duplication, other methods may also be used to prevent packet duplication.

Figure 2:
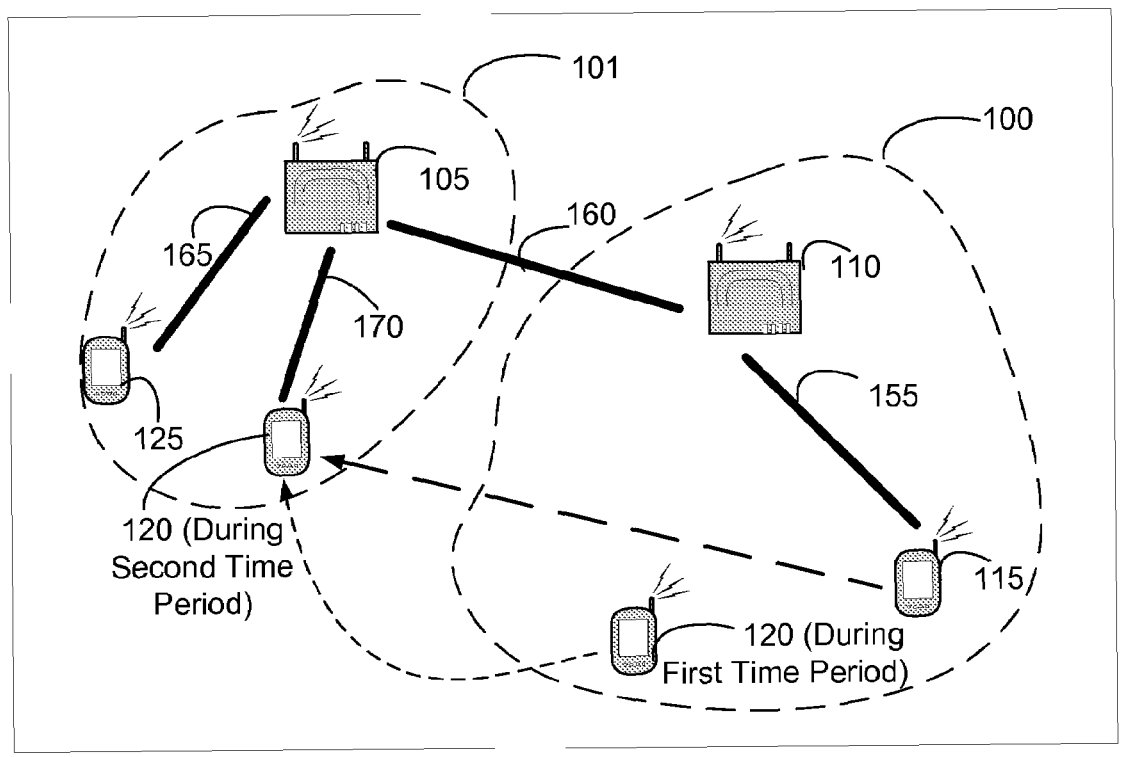
FIG. 2 is a block diagram that illustrates an example of a dynamic network topology.

FIG. 2 is a block diagram that illustrates an example of a dynamic network topology. This diagram is similar to the diagram illustrated in FIG. 1 except for a second instance of the destination node 120 in the BSS 101. In this example, the destination node 120 is illustrated to be in the BSS 100 during a first period and to be in the BSS 101 during a second period. When the destination node 120 is in the BSS 100 during the first period, the communication between the source node 115 and the destination node 120 may be through a direct link, as illustrated in FIG. 1. However, the direct link between the source node 115 and the destination node 120 may be established only when the source node 115 and the destination node 120 are in the same BSS 100. Thus, when the destination node 120 moves from the BSS 100 to the BSS 101, the communication between the source node 115 and the destination node 120 may be interrupted. When this happens, the source node 115 may not be aware of the change and may continue to retransmit packets using the direct link.

For one embodiment, when the destination node 120 is in the BSS 101 during the second period, it notifies the source node 115 that it has moved away from the BSS 100 to the BSS 101. For example, the destination node 120 may send a notification message to the source node 115 via the AP 105 using path 170. The AP 105 may then route the notification message to the AP 110 using path 160. As described above, the path 160 is also known as a distribution system (DS). The AP 110 may then route the notification message to the source node 115 using the path 155. Using this technique, the source node 115 is made aware that the destination node 120 has moved to from the BSS 100 to the BSS 101. As a result, the source node 115 may need to tear down the direct link that it previously used to communicate with the destination node 120 before the destination node 120 moves into the BSS 101.

The AP 105 and the AP 110 may communicate with one another to share information about the nodes that they are associated with. For example, after the destination node 120 moves to the BSS 101, the AP 105 may indicate that fact to the AP 110. For one embodiment, after the source node 115 receives the notification message from the destination node 120, the source node 115 may establish a new link to the destination node 120 using the AP 110.

For another embodiment, the notification message sent by the destination node 120 to the source node 115 may include information about the data packets that have been received by the destination node 120. The information about the data packets may include sequence information. For example, the destination node 120 may send sequence numbers of the data packets that it successfully received from the source node 115. The sequence numbers may then be used by the source node 115 to determine which packets to be sent next using the new link. For example, the new link used by the source node 115 to resume sending data to the destination node 120 may include the AP 110 in the BSS 100 and the AP 105 in the BSS 101. Thus, subsequent data packets sent by the source node 115 to the destination node 120 in the BSS 101 may travel the same route used by the notification message sent by the destination node 120 to the source node 115.

For one embodiment, quality of service (QoS) may be incorporated with the data packets sent by the source node 115 to the destination node 120. One purpose of QoS is to deliver data packets from one class in preference to those data packets in another class. For example, after the destination node 120 moves to the BSS 101, it may be necessary for the destination node 120 to send sequence information for each service class to the source node.

It may be noted that when using QoS, the data packets within each class may need to be re-ordered. This may require the receiver in the destination node 120 to maintain a separate duplicate detection cache for each class. This may also require the transmitter in the source node 115 to keep track of the sequence information of transmitted packets for each class.

Figure 3:
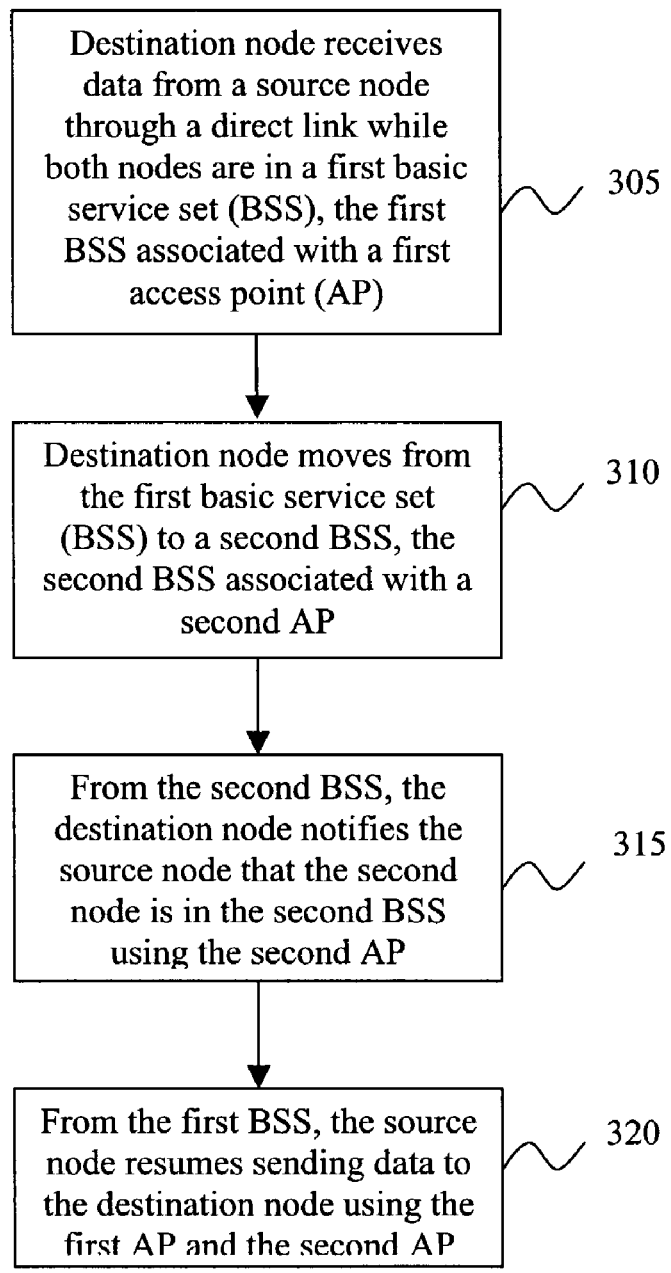
FIG. 3 is a flow diagram illustrating an example of a notification process performed by a destination node after the destination nodes moves from one BSS to another BSS.

FIG. 3 is a flow diagram illustrating an example of a notification process performed by a destination node after the destination nodes moves from one BSS to another BSS. At block 305, the destination node and the source node may communicate with one another using a direct link while being in the same BSS. The destination node then moves to a new location in another BSS that is different from the BSS that the source node is in, as shown in block 310.

At block 315, the destination node may send a notification message to the source node from the new location. The destination node may do this by sending the notification message to the new AP that it is associated with. The new AP may then forward the notification message to the AP that the source node is associated with. One skilled in the art will recognize that there may be other APs that the notification may be forwarded to before it arrives at the AP that the source node is associated with. Once the source node receives the notification message, it is aware that the direct link that it was using to communicate with the destination node is no longer necessary, and it may proceed to tear down the direct link.

At block 320, the source node may then re-establish the communication with the destination node using the new AP that the destination node is associated with.

The operations of these various methods may be implemented by a processing unit in a digital processing system, which executes sequences of computer program instructions which are stored in a memory which may be considered to be a machine-readable storage media. The memory may be random access memory, read only memory, a persistent storage memory, such as mass storage device or any combination of these devices. Execution of the sequences of instruction causes the processing unit to perform operations according to embodiments of the present invention such as, for example, the operations described in FIG. 3.

The instructions may be loaded into memory of the computer from a storage device or from one or more other digital processing systems (e.g. a server computer system) in a network. The instructions may be stored concurrently in several storage devices (e.g. DRAM and a hard disk, such as virtual memory). Consequently, the execution of these instructions may be performed directly by the processing unit.

In other cases, the instructions may not be performed directly or they may not be directly executable by the processing unit. Under these circumstances, the executions may be executed by causing the processor to execute an interpreter that interprets the instructions, or by causing the processor to execute instructions which convert the received instructions to instructions which can be directly executed by the processor. In other embodiments, hardwired circuitry may be used in place of or in combination with software instructions to implement the present invention. Thus, the present invention is not limited to any specific combination of hardware circuitry and software, nor to any particular source for the instructions executed by the computer or digital processing system.

Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A method, comprising:
   from a first node in a first basic service set (BSS) in a wireless local area network (LAN), sending a notification message via a first access point (AP) and a second AP to a second node in a second BSS in the wireless LAN to indicate to the second node that the first node moved from the second BSS to the first BSS, the first AP associated with the first BSS, the second AP associated with the second BSS, wherein the second node was sending data to the first node using a direct communication link between the second node and the first node when the first node moved to the first BSS, further comprising:
   from the second node, resuming said sending data to the first node after receiving the notification message,
   wherein resuming said sending data comprises:
   establishing an indirect communication link between the second node and the first node using the second AP and the first AP to enable the second node to resume said sending data to the first node.

2. The method of claim 1, further comprising:
   terminating the direct communication link between the second node and the first node.

3. The method of claim 1, further comprising:
   determining data to be sent by the second node using sequence information included in the notification message.

4. The method of claim 3, wherein the sequence information includes information about data sent by the second node and received by the first node.

5. The method of claim 3, wherein the sequence information includes information about data sent by the second node and received by the first node for different classes of service.

6. The method of claim 5, wherein the second node resumes sending data to the first node based on the different classes of service.

7. A method, comprising:
   from a second node in a second basic service set (BSS), sending a message to a first node in a first BSS to notify the first node that the second node moved from the first BSS to the second BSS, the message sent via a second access point (AP) associated with the second BSS and a first AP associated with the first BSS, the first BSS and the second BSS being in a wireless local area network (LAN); and
   from the first node, terminating a direct communication path that the first node was using to communicate with the second node when the second node was in the first BSS, and resuming communication with the second node using the first AP and the second AP,
   wherein the message comprises a series of sequence information, each sequence information being about data last received by the second node for a particular class of service when the second node was in the first BSS,
   wherein each sequence information about the data last received by the second node for a particular class of service is used by the first node to determine data next in sequence to be sent by the first node for the particular class of service.

8. The method of claim 7, wherein the communication between the first node and the second node includes the first node sending data to the second node, and wherein the message comprises sequence information about data last received by the second node when the second node was in the first BSS.

9. The method of claim 8, wherein the sequence information about the data last received by the second node is used by the first node to determine data next in sequence to be sent by the first node.

10. A computer readable medium embodied with a computer executable instructions which, when executed in a processing system, causes the processing system to perform a method comprising:
    from a second node in a second basic service set (BSS), sending a message to a first node located in a first BSS to notify the first node that the second node moved from the first BSS to the second BSS, the first BSS and the second BSS being in a wireless local area network (LAN); and
    from the first node, terminating a direct communication path that the first node was using to communicate with the second node when the second node was in the first BSS, and resuming communication with the second node using an access point (AP) associated with the first BSS and an AP associated with the second BSS,
    wherein the message comprises a series of sequence information, each sequence number being about data last received by the second node for a particular class of service when the second node was in the first BSS, wherein the series of sequence information about the data last received by the second node for the different classes of service is used by the first node to determine data next in sequence to be sent by the first node for each of the different classes of service.

11. The computer readable medium of claim 10, wherein the communication between the first node and the second node includes the first node sending data to the second node, and wherein the message comprises sequence information about data last received by the second node when the second node was in the first BSS.

12. The computer readable medium of claim 11, wherein the sequence information about the data last received by the second node is used by the first node to determine data next in sequence to be sent by the first node.

13. The computer readable medium of claim 10, wherein the message is sent from the second node to the first node using the AP associated with the second BSS.

14. A system, comprising:
a first node associated with a first access point (AP); and
a second node associated with the first AP during a first period and associated with a second AP during a second period,
wherein the first node, the first AP, the second node, and the second AP are included in a wireless local area network (LAN),
wherein the first node communicates directly with the second node during the first period,
wherein the second node notifies the first node during the second period when the second node is associated with the second AP, and
wherein the first node communicates with the second node during the second period using the first AP and the second AP,
wherein the first node communicates with the second node to send data to the second node, and wherein during the second period the second node further notifies the first node sequence information about data received by the second node,
wherein the first node sends data to the second node using different classes of service, and wherein the sequence information about the data includes sequence information for the different classes of service.

15. The system of claim 14, wherein the first node and the second node are wireless devices, and wherein the first AP is in a first basic service set (BSS) and the second AP is in a second BSS.

16. A system, comprising:
a first node associated with a first access point (AP);
a second node associated with the first AP, the first node exchanging data with the second node using a direct communication path when both the first node and second node are associated with the first AP; and
a second AP coupled to the first AP, wherein when a move by the first node causes it to be associated with the second AP instead of being associated with the first AP, the first node notifying the second node about the move using the second AP and the first AP, wherein the first node, the first AP, the second node, and the second AP are included in a wireless local area network (LAN),
wherein after the second node is notified by the first node, an alternate communication path to the first node is established using the first AP and the second AP,
wherein the first node further notifies the second node information about data received by the first node when the first node was associated with the first AP,
wherein the information about the data includes sequence information, the sequence information used by the second node to determine next data to be sent to the first node using the alternate communication path.

17. The system of claim 16, wherein after the second node is notified by the first node, the direct communication path is terminated.

* * * * *